Oct. 9, 1928.　　　　　　　　　　　　　　　　　　　1,687,123
F. DECKEL ET AL
CAMERA SHUTTER
Filed Oct. 23, 1926　　　　4 Sheets-Sheet 1

Inventors
Friedrich Deckel
Martin Geiger
By
their Attorneys

Oct. 9, 1928.  
F. DECKEL ET AL  
1,687,123  
CAMERA SHUTTER  
Filed Oct. 23, 1926 4 Sheets-Sheet 2

Patented Oct. 9, 1928.

1,687,123

UNITED STATES PATENT OFFICE.

FRIEDRICH DECKEL AND MARTIN GEIGER, OF MUNICH, GERMANY, ASSIGNORS TO THE FIRM: FRIEDRICH DECKEL PRÄZISIONSMECHANIK UND MASCHINENBAU, OF MUNICH, BAVARIA, GERMANY.

CAMERA SHUTTER.

Application filed October 23, 1926. Serial No. 143,551, and in Germany December 2, 1925.

The present invention relates to camera shutters and has for its object to provide means for regulating the exposure time of such shutters in a very simple yet extremely accurate and sensitive manner without step or break over a very extended range of adjustment.

Another object of this invention is to provide means for delaying the operation of the shutter after the same has been released thus permitting the operator to release the shutter, to step in front of the camera and to take his position in a group to be photograped before the actual exposure begins.

Another important object of the invention is to combine the means for regulating the duration of exposure and the means for delaying the beginning of the exposure after releasing the shutter in a single housing in compact form, to provide a single operating member for both these regulating and retarding means and means for permitting ordinary exposures of the shutter without using the retardation at the beginning of the exposure.

The preferred form of means by which these objects and various other improvements are accomplished is described in the following specification and illustrated in the drawings forming a part thereof; and the invention consists in said means and equivalent devices having substantially the same function and result within the scope of the appended claims. In said drawings Fig. 1 is a top view of a shutter containing the form of the invention above referred to.

Fig. 2 is a similar top view showing primarily the setting disc.

Fig. 3 shows the shutter blades in the same position as in the Figures 1 and 2.

Figure 13:
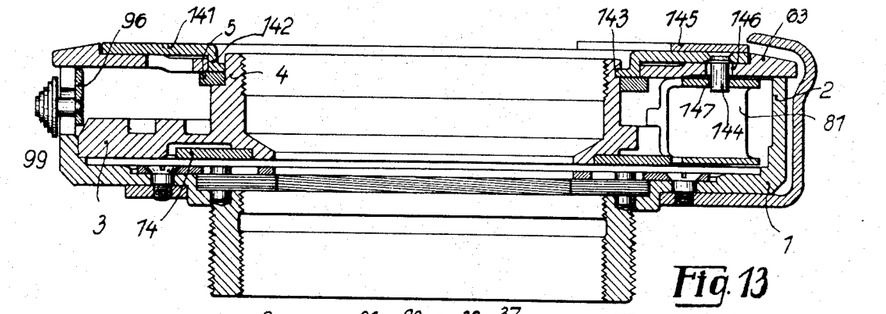
Fig. 13 is a cross section of the shutter on an enlarged scale.

The shutter housing 1 has an outer tubular rim 2 (Fig. 13). There is fastened to this housing an intermediate plate 3 with an inner tubular collar 4. The space between the housing and the intermediate plate is used for the shutter blades and their actuating ring. The iris diaphragm which is also mounted in this space will not be described being of usual construction and not pertaining to this invention. The annular recess between the rim and collar 2 and 4 contains the exposure regulating means, the means for retarding the beginning of the exposure, and the releasing mechanism.

Figures 4, 5, 6:
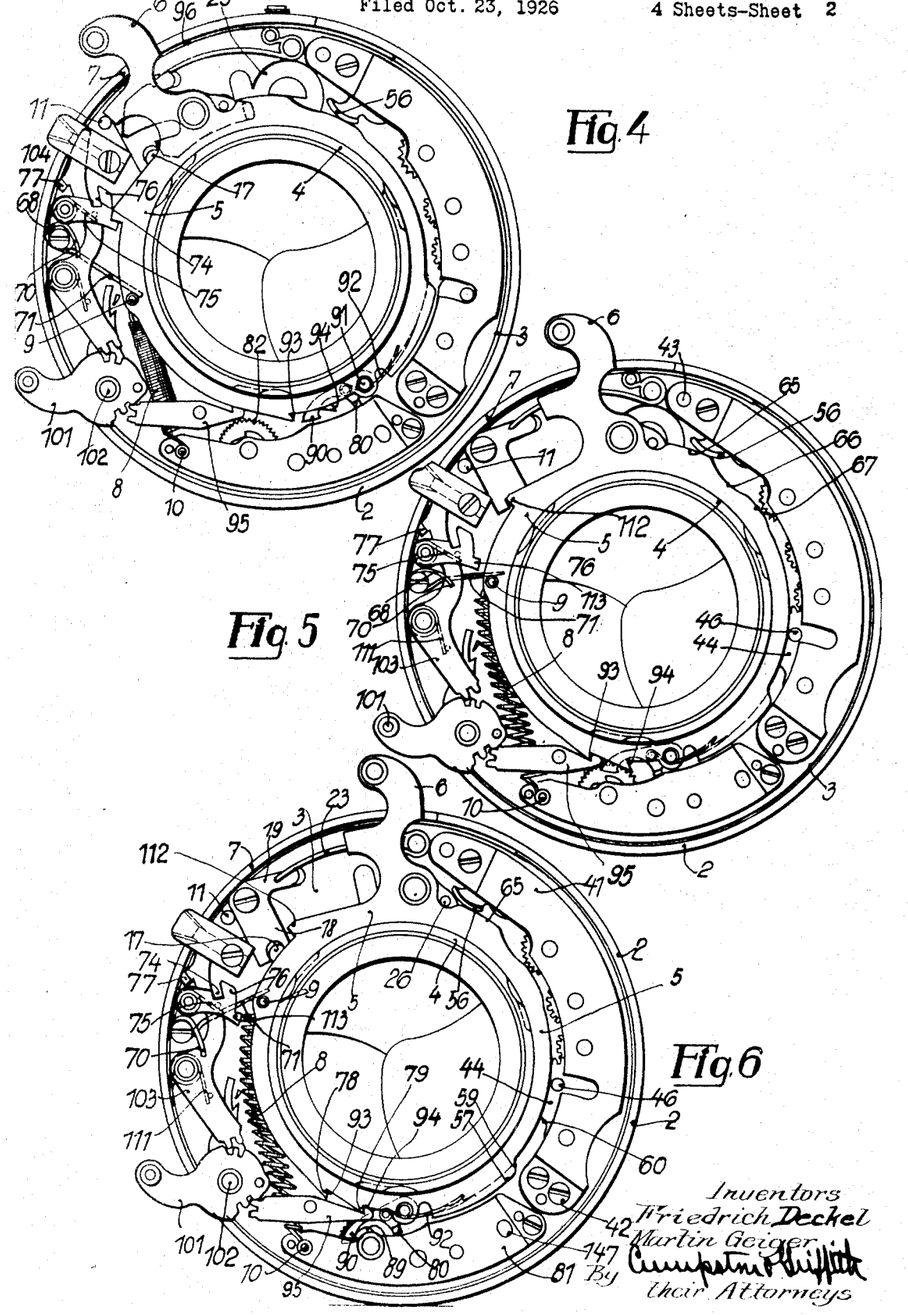
Fig. 4 is a top view of the shutter in Figure 1 without the cover plate and the setting disc showing the shutter mechanism in normal position run down.
Fig. 5 is identical with Figure 4 but shows the shutter set for an ordinary exposure without the retardation before the beginning of exposure.
Fig. 6 is identical with the Figures 4 and 5 but shows the shutter set for a retardation of the beginning of exposure.
Figures 14, 15, 16, 17:
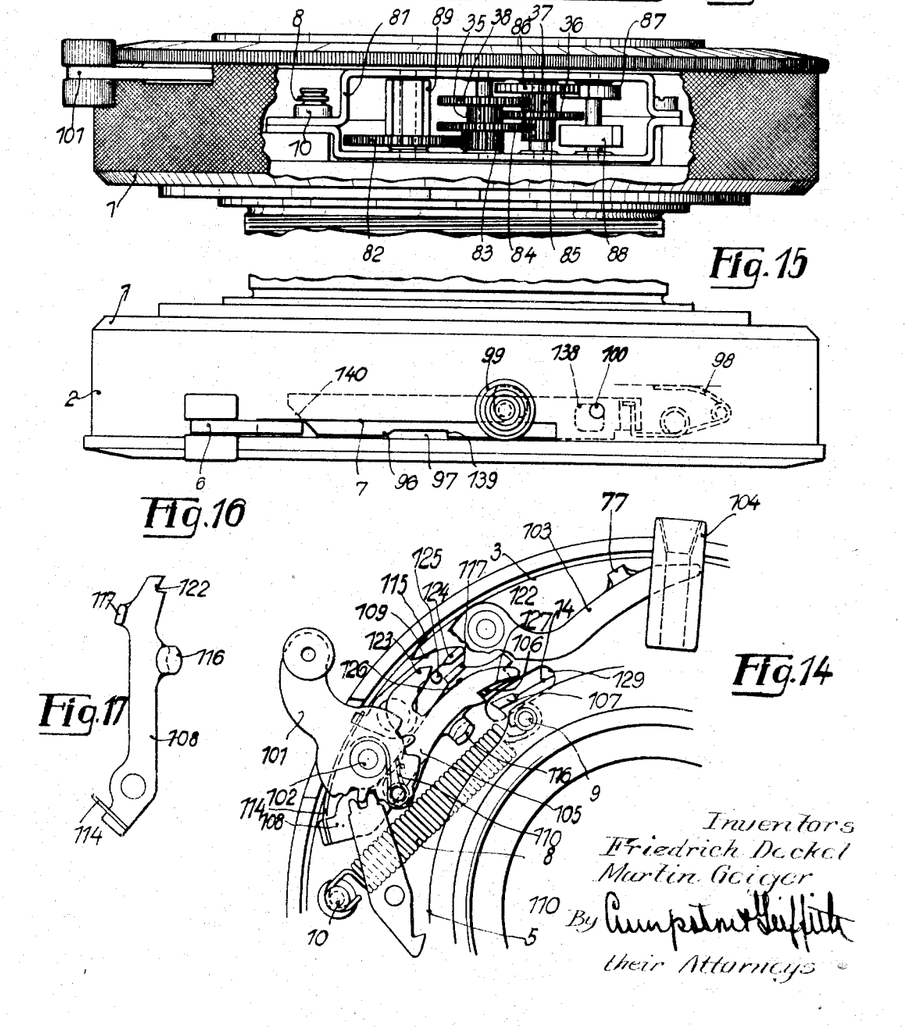
Fig. 14 shows the mechanism for time and bulb exposure on an enlarged scale.
Fig. 15 is a side view of the retarding mechanism shown in Figure 10.
Fig. 16 shows the stop for the operating lever.
Fig. 17 shows the time lever of the releasing mechanism.

An actuating ring 5 hereinafter called the master member is located turnably on the inner tubular collar 4 of the housing. An operating lever 6 forming part of this ring 5 extends towards the outside of the housing 1, the outside rim 2 being recessed at 7 to permit the lever to pass (Figs. 4 and 16). A spring 8 furnishing the power for operating the shutter is connected at 9 to the actuating ring 5 and at the other end 10 to the intermediate plate 3 (see also Fig. 4). A pin 11 serves as a stop against which the spring 8 pulls the actuating ring 5.

Figures 1, 2, 3:
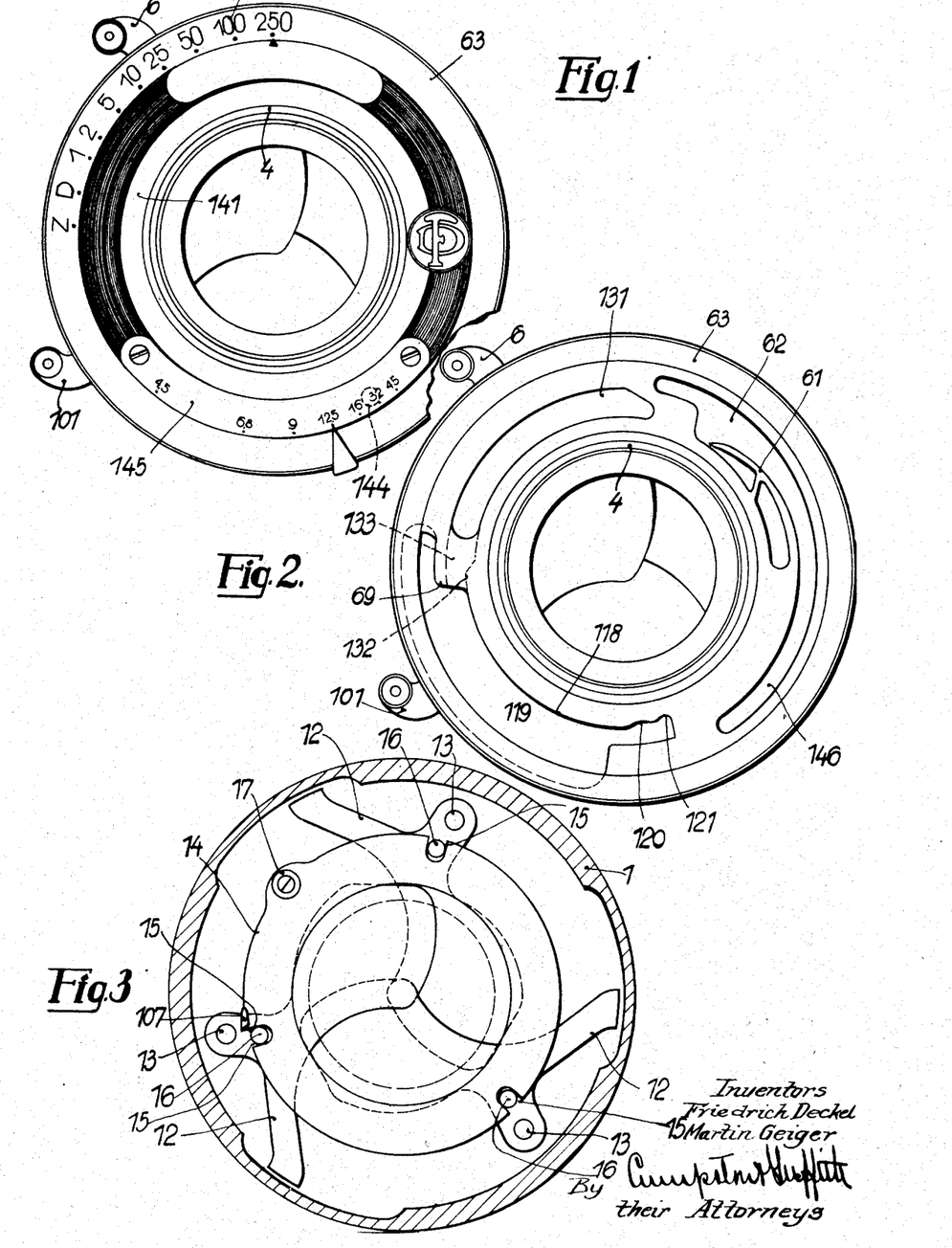
Figures 7, 8, 9, 10, 11, 12:
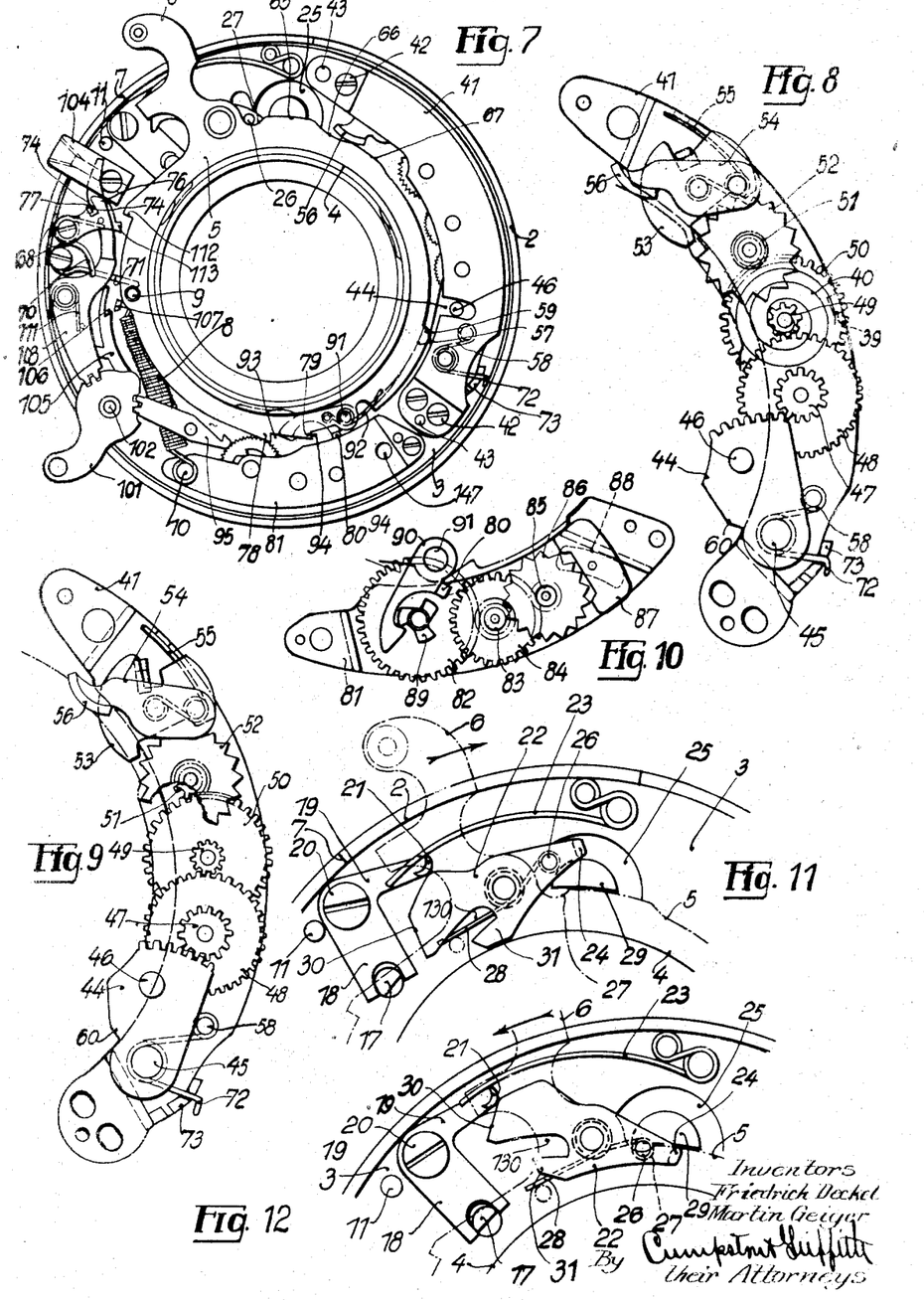
Fig. 7 shows the shutter of the Figures 4 to 6 partly run down.
Fig. 8 shows the exposure regulating mechanism set on an enlarged scale.
Fig. 9 shows the exposure regulating mechanism of Figure 8 partly run down.
Fig. 10 is a top view of the retarding means before the exposure on an enlarged scale.
Figs. 11 and 12 show the connection of the actuating ring to the shutter blade mechanism in two positions also on an enlarged scale.

In the recess between the housing 1 and the intermediate plate 3 there are mounted the shutter blades 12 in the present case three of known construction to swing on pins 13 (Fig. 3). A shutter blade actuating ring 14 is provided with radial slots 15 which engage pins 16 fastened to the shutter blades 12. Thus by oscillating the ring 14 back and forth the shutter blades are opened and closed. A pin 17 fastened to the ring effects this oscillating movement by protruding through a slot in the intermediate plate 3 and engaging with the forked end 18 of a bell crank 19 (Figures 11 and 12). This crank is mounted turnably on a shoulder screw 20 fastened to the plate 3. The other end 21 of the bell crank is turned up to coact with a lever 22 mounted turnably beneath and on the actuating ring 5 which is shown in dot and dash lines on the Figures 11 and 12. A spring 23 tends to turn the bell crank in a clockwise direction. One arm of the lever 22 is turned down at the end 24 which end enters into grooves 25 cut into the intermediate plate 3. A pin 26 fastened near the turned down end 24 serves as a stop in one direction for the oscillating movement of the lever 22 laying up against the actuating ring 5 in a recess 27. A spring 28 weaker than the spring 23 tends to swing the lever in a clockwise direction whenever the spring 23 cannot exert its influence. When turning the operating lever 6 in the direction of the arrow in Figure 11 the end 24 follows the circular groove 25 on account of the pressure exerted by the spring 23 on the lever 22. When turning the lever 6 further the end of the lever 22 passes from under the end 21 of the bell crank lever 19 and the spring 28 rocks the lever 22 in a clockwise direction. The actuating ring having been released moves in the direction of the arrow on the Figure 12 and the end 24 of the lever 22 enters below the half round portion 29 formed by the circular and a straight groove in the plate 3. When now the tapered end 30 of the lever 22 strikes the end 21 of the bell crank 19 the lever 22 is supported by the ledge 29. The bell crank turning on its pivot 20, moves the pin 17 and opens thereby the shutter blades 12. As soon as the end 24 loses the support of the ledge 29 the spring 23 swings the bell crank 19 back to the normal position and tends to close the shutter blades. This movement is accelerated by a projection 31 on the lever 22 striking against the pin 17. Thus a very quick opening and shutting of the shutter blades is effected yet a sufficient interval is provided for applying the retardation which determines the length of exposure. A swinging movement of the actuating ring 5 in one direction is transformed in a movement back and forth of the shutter actuating ring 14. The movement of the actuating ring 5 in the opposite direction does not affect the shutter actuating ring.

The exposure regulating mechanism which is shown enlarged in the Figures 8 and 9 is mounted in a bracket 41 consisting of an upper and a lower plate. The bracket is fastened by screws 42 and pins 43 to the intermediate plate 3. This construction has the advantage that the regulating mechanism may be assembled and adjusted separately and mounted afterwards as a complete unit. A toothed sector 44 turning on a pivot 45 carries a pin 46 which extends upwards into a setting disc 63 controlling the angular movement of the sector as will be described later. A pinion 47 in engagement with the sector 44 is fastened to a gear 48 which meshes with a pinion 49. The latter is fastened to a gear 50 which stands in engagement with a pinion 51. In order to take up any play between the gear teeth a spiral spring 40 is fastened to the gear 50 with one end and to a bent down portion 39 of the top plate of the bracket 41 with the other end. The pinion 51 is fastened to an anchor wheel 52. An anchor 53 engaging with this anchor wheel is mounted turnably on a lever 54 which is pivoted like the various sets of gears between the two plates of the bracket 41. A spring 55 tends to swing the lever in a counterclockwise direction bringing the shoe shaped end 56 of the lever 54 to bear against the circumference of the ring 5 which is shaped as a cam with depressions and raises effecting a variable depth of engagement of the anchor with the anchor wheel and providing in this manner a variable retardation, see also Figures 4 to 7 where different positions of the shoe 56 are shown. A turned down ledge 57 of the actuating ring 5 engages with sector 44 which stands under the influence of a spring 58 tending to turn the sector in a counterclockwise direction. The edge 59 of the ledge strikes the edge 60 of the sector and forces the sector out of the way. The tension of the spring 58 may be varied when assembling the train of gears and adjusting the retardation by hooking the end 72 in back of another projection 73 of which several are provided bent upwards from the bottom plate of the bracket 41. When setting the shutter by turning the lever 6 in a clockwise direction the ledge 57 passes by the sector 44. After the ledge has passed, the sector turns counterclockwise until the pin 46 lays up against the side 61 of a slot 62 in the setting disc 63 which is turnably mounted concentric to the actuating ring 5 (Fig. 2). The side 61 is shaped to permit the pin 46 to assume all intermediate positions from disengagement to full engagement of the sector with the ledge 57. The metal in back of the cam shaped edge 61 is broken away in order to permit a slight deformation of the curve when assembling in order to have the actual time of exposure correspond exactly with the scale 64 on the disc 63. The movement of the sector 44 in a counterclockwise direction when setting the shutter is facilitated by moving the anchor 53 out of engagement with the anchor wheel which is accomplished by a raised portion 65 of the ring 5 lifting the anchor lever 54 as is shown in Fig. 5. When the ring 5 has run down until the edge 59 comes in contact with the sector 44 a depression 66 is just passing underneath the shoe 56 of the anchor lever 54 bringing the anchor to full engagement and causing a maximum of resistance to the edge 59 pressing against the corner 60 of the sector. When turning the ring 5 further a portion 67 somewhat raised decreases the depth of engagement of the anchor 53, so that the resistance is decreased after the energy of the blow has been spent (Fig. 7). Thus a very severe resistance is used at the beginning which if constant throughout might stall the shutter. In the intermediate positions of the pin 46 the sector 44 has turned around the pivot 45 a certain distance causing the edge 59 of the actuating ring 5 to strike the sector 44 later. Now the shoe 56 has partly or wholly left the depression 66 varying thus the initial resistance. These two factors viz: variation of the magnitude of the retardation and variable time and/or distance during which the retardation is applied, permit an unbroken regulation over a very extended range of exposure with a rather light motor spring. In order to attain the very fastest exposures however there is provided an auxiliary spring 68 normally not coming into play. This spring is placed under tension by a projection 69 of the setting disc which at the setting for the fastest speed bears against the end 70 of the spring, the other end 71 of which presses against the pin 9 on the actuating ring 5 thus supplementing the action of the spring 8 on the ring (Figs. 2, 4 and 5).

The device for retarding the shutter before the beginning of the exposure is mounted similarly to the exposure regulating mechanism and for the same reason namely facility of assembling on a separate bracket 81 consisting of an upper and a lower plate (Figs. 10 and 15). There are mounted between the plates a gear 82 in mesh with a pinion 83. The latter is fastened to a gear 84 which is in engagement with a pinion 85. Connected to this pinion there is provided a gear 36 in engagement with a pinion 35 (Fig. 15). This pinion is connected to a gear 38 which engages with a pinion 37. The gears 35 and 38 are mounted on the same shaft as the gears 83 and 84 but turn independently of these gears. Connected to the pinion 37 there is an anchor wheel 86 mounted independently but on the same shaft as the gears 85 and 36. An anchor 87 is mounted to engage therewith. A weight 88 is fastened to the anchor 87 and furnishes a further retarding effect on account of its mass. There is fastened to the gear 82 a three tooth clutch member 89. To engage with this clutch member there is turnably mounted a clutch lever 90 on a pin 91 of the actuating ring 5. A spring 92 tends to swing the lever in a counterclockwise direction. A bent up projection 80 of the lever 90 resting against the top plate of the bracket 81 holds the clutch lever in place. In order to bring the retarding device into operation the arm 6 must be turned further than the setting of the exposure regulating means alone would require. To lock the ring in the set condition there are provided two notches 93 and 94 in the ring 5 and a locking lever 95 to engage with the notches. The notch 93 is used when employing the shutter without retardation before the exposure, while the notch 94 is provided for the retardation before the exposure.

In order to facilitate the setting of the shutter for either mode of operation there is provided a stop 96 for the lever 6 to determine the position for the normal exposure and to close the recess 7 effectively (Fig. 16). When setting the shutter the lever 6 bears against a cam end 140 of the stop 96 and pushes the latter out of the way against the pressure exerted by a spring 98. A recess 97 in the stop 96 of a size to fit over the lever 6 and a square end 139 serve as the limiting means for the setting of the lever. If however the retardation before the beginning of the exposure is to be included it is necessary to lift the stop 96 by using the button 99 fastened to the stop. As soon as the ledge 139 is free of the lever 6 the stop is brought forward a trifle by the action of the spring 98 and the semi floating support of the stop on a small pin 100 in a larger hole 138 and rests on the side of the lever 6. Now the setting of the lever may be completed by pulling the lever against the end of the recess 7 which acts as a fixed stop. Of course the stop might also be held out of the way right at the beginning of the setting and the lever 6 be moved all the way at once.

For releasing the shutter there is provided a lever 101 rotatably located on a stud 102 with a gear portion on either side, one side engaging the latching lever 95 and the other the cable release lever 103 which extends with one end towards the nipple 104 for attaching the release cable.

The nose 79 in back of the notch 94 is somewhat higher than the nose 78 in back of the notch 93 (Figs. 6, 7 and 14). The higher nose 79 requires the lever 101 to be turned further for releasing the locking lever 95. On the cable release lever 103 turning with the lever 101 there is provided a bent up stop 77. A lever 76 held by a spring 75 against this stop 77 has a jaw like opening 74 for the stop to enter. The adjustments are made so that this happens as soon as the lever 101 is turned far enough to disengage the locking lever 95 from the notch 94 preventing a return of the levers 103, 101 and 95 to their normal position which they tend to assume under the influence of a spring 111 attached to the lever 103. The locking lever 95 is held in this manner far enough away from the lower nose 78 in order not to engage with it. The actuating ring 5 has a projecting nose 112 which when running down engages a nose 113 on the lever 76 and turns the latter to release the stop 77 permitting the release lever 101 to return to normal position.

There is linked to the lever 101, a lever 105 for actuating directly the shutter blades for time and bulb exposures (Fig. 14). This lever is provided with a notch 106 with coacts with a bent up portion 107 of the ring 14 (Fig. 3) which protrudes upwards through a slot 129 in the intermediate plate 3. A spring 110 tends to swing the lever 105 against the projection 107. Two more levers 108 (Fig. 17) and 109 with springs 114 and 115 respectively tending to turn them in a clockwise direction are extending roughly parallel to the lever 105. The lever 108 carries two projections 116 and 117 of which the nose 116 extends upwards into the setting disc 63 where it lays up against the side 118 of a slot 119 (Fig. 2). The larger portion of the side 118 is concentric holding the projection 116 back so far that it in turn prevents an engagement of the lever 105 with the projection 107. The movement of the release lever 101 in this position cannot therefor affect the shutter mechanism directly. Besides this concentric portion in the setting disc 63 there are two depressions 120 and 121 the latter somewhat deeper than the first. With the projection 116 in the depression 120 the lever 105 is free to engage the projection 107 and a bulb exposure results the length of exposure depending on the duration of depression of the lever 101. When finally the projection 116 lies in the depression 121 the lever 108 is permitted to swing that far towards the projection 107 that a notch 122 at the end of this lever can engage with the projection and prevent the closing of the shutter blades after the depression of the lever 101 ceases. On a second depression of the lever 101 however a pointed arm 123 of the lever 105 enters in back of a projection 124 on the lever 109. A pin 125 prevents any further movement of the lever 109 so that the face 126 of the lever 105 forces the projection 117 and the lever 108 back freeing the notch 122 from the projection 107. Now the shutter may close again. The entering of the point 123 in back of the projection 124 is caused by the face 127 of the lever 105 sliding past the projection 107. During bulb exposure and for the opening movement during time exposure the notch 106 lays over the projection 107 bringing the lever 105 so far towards one side that the pointed end 123 passes in between the projections 124 and 117.

In order to prevent the lever 22 (Figs. 11 and 12) from interfering with the pin 17 during bulb and time setting the pin 26 on the lever 22 extends upwards into the setting disc 63 where an opening 131 is provided permitting the pin a free radial movement (Fig. 2). For bulb and time setting however the disc 63 is turned to a position where the pin 26 enters a groove 133 on the underside of the disc and is forced a certain distance outwards by a projection 132. The resulting position of the lever 22 permits the pin 17 to enter into a slot 130 between the part 30 and the projecting hook 31, the pin 17 having been cut off halfways in order to decrease the width of the slot.

The actuating ring 5 and the setting disc 63 are held in place axially by a cover plate 141 (Fig. 13) which is provided with a drawn down tubular portion 142 whereon there are provided three projecting noses 143 spaced at 120° relatively to each other. Corresponding recesses on the ring 4 permit a bayonet fastening. In order to prevent a disengagement of the bayonet a locking pin 144 is located in the cover plate 141 beneath the scale 145 for the iris diaphragm. In the setting disc 63 the opening 62 has been extended to a long radial portion 146 where the locking pin passes through. In the bracket 81 there is provided a hole 147 into which the end of the pin enters.

Having now fully explained our invention we do not wish to be understood as limiting ourselves to the exact details of construction as obviously many modifications will occur to a person skilled in the art.

What we claim is:

1. In a photographic shutter the combination with a blade mechanism including a blade actuating ring and a master member for operating said ring, of a retarding device operated by said master member and a second retarding device also operated by said master member, the first of said retarding devices controlling the duration of exposure and the second controlling the master member before the beginning of the exposure.

2. In a photographic shutter the combination with a blade mechanism and a master member for operating said blade mechanism, of two retarding devices both operated by said master member, the first of said retarding devices for controlling the duration of exposure, the second for retarding the master member before exposure, and setting means for said master member operable to connect only said exposure controlling retarding device or both retarding devices as desired.

3. In a photographic shutter the combination with a blade mechanism including a blade actuating ring of a master member for operating said blade mechanism and retarding means operated by said master member, said retarding means including a train of gears, an anchor wheel, an anchor, and means for varying the depth of engagement of said anchor with said anchor wheel while being operated by said master member.

4. In a photographic shutter the combination with a blade mechanism including a blade actuating ring of a master member for operating said blade mechanism, retarding means operated by said master member, said retarding means including a train of gears, an anchor wheel and an anchor, and a cam moving with said master member for varying the depth of engagement of said anchor with said anchor wheel.

5. In a photographic shutter the combination with a blade mechanism including a blade actuating ring, of a ring shaped master member for operating said blade mechanism, retarding means for controlling the duration of exposure, operated by said master member, said retarding means including a train of gears, an anchor wheel, an anchor, and a swinging member on which said anchor is mounted, and a cam portion on said master ring, engaging with said anchor lever and causing a variable depth of engagement of said anchor with said anchor wheel.

6. In a photographic shutter the combination with a blade mechanism including a blade actuating ring, of a ring shaped master member for operating said blade mechanism, two retarding devices, both operated by said master ring, the one controlling the duration of the exposure and the other retarding the beginning of the exposure, means for setting said master ring a certain angular distance for operating the exposure controlling means, a movement of greater magnitude being required for including the retarding means before the exposure, and locking means for holding said master member in the positions for both modes of operation.

7. In a photographic shutter the combination with a blade mechanism including a blade actuating ring, of a ring shaped master member for operating said blade mechanism, two sets of retarding devices, the one controlling the duration and the other retarding the beginning of the exposure, means on said master ring for operating consecutively both said retarding devices, a removable stop and a fixed stop for controlling the setting of said master member, said removable stop to limit the setting to include only said retarding device for controlling the duration of exposure and said fixed stop for including both said retarding devices.

8. In a photographic shutter the combination with a blade mechanism including a blade actuating ring, of a ring shaped master member for operating said blade mechanism, two sets of retarding devices, the one controlling the duration and the other retarding the beginning of the exposure, arranged to be operated consecutively by said master member, a member for locking said master member in two distinct positions after being set, one position to only include the retarding means for controlling the duration of exposure, the other position to include both retarding devices, a releasing device for said locking member, and means for preventing said locking device from reengaging said master member after the latter has been released from the setting for both retarding devices.

9. In a photographic shutter the combination with a blade mechanism including a blade actuating ring, of a master member for operating said blade mechanism, means for controlling the duration of the exposure and for retarding the beginning of the exposure after said master member is released, said controlling and retarding means operated by said master member, and a single motor member for furnishing the power to operate said master member.

10. In a photographic shutter, the combination with a casing, a lens barrel therein, and blade mechanism for closing the barrel, of a master member for operating said blade mechanism to make an exposure, and two independent unitary retarding devices for said master member, one adapted to postpone the exposure, and the other adapted to time the length of exposure.

11. In a photographic shutter, the combination with a casing, a lens barrel therein, and blade mechanism for closing the barrel, of a master member for operating said blade mechanism, two unitary escapement mechanisms mounted within the casing, and independent connecting means between the ring and the escapement mechanisms so arranged that one escapement may delay the opening of the blades and the other may delay their closing.

12. In a photographic shutter, the combination with a casing, a lens barrel therein, and blade mechanism for closing the barrel, of a master member for operating said blade mechanism to make an exposure, and two independent unitary retarding devices for said master member each being detachably mounted in the casing, and adapted to act on the master member during different periods of its operative movement, one unit acting to delay the opening of the blades and the other acting to delay the closing of the blades.

13. In a photographic shutter, the combination with a casing, a lens barrel therein, and blade mechanism for closing the barrel, of a master ring for operating said blade mechanism, said ring being mounted rotatably around the lens barrel and spring biased to a normal position; means to rotate the ring against the spring to set the shutter, connections between the ring and blade mechanism whereby the blade will be opened and closed by the return rotation of the ring, and two independent unitary adjustable retarding devices for said ring, one to control its backward rotation previous to opening the blades, and the other controlling its backward rotation during the interval between the opening and closing of the blades.

14. In a photographic shutter, the combination with a casing, a lens barrel therein, and blade mechanism for closing the barrel, of a master ring for operating said blade mechanism, said ring being mounted rotatably around the lens barrel and spring biased to a normal position; means to rotate the ring against the spring to set the shutter, connections between the ring and blade mechanism whereby the blade will be opened and closed by the return rotation of the ring, and a variable retarding device for the ring operative during the period that the blades are open, and arranged to exert the maximum retarding effect when first applied.

15. In a photographic shutter, the combination with a blade mechanism including a blade actuating member, of a master member having the form of a ring capable of oscillation back and forth in opposite directions, and a pivoted member operatively interposed between said master ring and said blade actuating member for transforming a movement of said master ring in one direction into a positive movement of said blade actuating member both in one direction and in the opposite direction to open and positively to close said blades.

16. In a photographic shutter, the combination with a blade mechanism including a blade-actuating ring capable of oscillation back and forth, of a master member having the form of a ring also capable of oscillation back and forth, a lever operatively connected to said blade-actuating ring, and mechanism carried by said master ring for engaging said lever to rock it first in one direction and then in the opposite direction during movement of said master member in a single direction, so that said blade-actuating ring is oscillated back and forth to open and close said blades.

17. In a photographic shutter, the combination with a blade mechanism including a blade-actuating ring capable of oscillation back and forth, of a master member having the form of a ring also capable of oscillation back and forth, a bell crank lever operatively connected to said blade-actuating ring, and a lever carried by said master ring for rocking said bell crank lever first in one direction and then in the opposite direction during movement of said master member in a single direction, so that said blade-actuating ring is oscillated back and forth to open and close said blades.

18. In a photographic shutter, the combination with a blade mechanism including a blade-actuating ring capable of oscillation back and forth, of a master member having the form of a ring also capable of oscillation back and forth, a bell crank lever operatively connected to said blade-actuating ring, and an operating lever carried by said master ring for cooperation with said bell-crank lever, said operating lever being ineffective to move said bell-crank lever when said master ring is moved in one direction but being effective to rock said bell-crank lever first in one direction and then in the opposite direction during movement of said master ring in the other direction, so that said blade-actuating ring is oscillated back and forth to open and close said blades.

19. In a photographic shutter, the combination with a blade mechanism, of a master member for operating said blade mechanism, variable retarding mechanism for resisting the movement of said master member, and means controlled by the movement of said master member for varying the resistance of said retarding mechanism.

20. In a photographic shutter, the combination with a blade mechanism, of a master member for operating said blade mechanism, variable retarding mechanism for resisting the movement of said master member, and cam means moving with said master member for varying the resistance of said retarding mechanism at different points in the movement of said master member.

21. In a photographic apparatus, the combination with a single unitary housing, of shutter blade mechanism, a master member within said housing for operating said blade mechanism, and means also within said housing for delaying the initial opening actuation of said blades by said master member and for retarding the closing of said blades after they have been opened.

22. In a photographic apparatus, the combination with a single unitary housing, of shutter blade mechanism, a master member within said housing for operating said blade mechanism, means also within said housing for delaying the initial opening actuation of said blades by said master member and for retarding the closing of said blades after they have been opened, and an annular member turnably mounted on said housing for controlling the extent of the delay in closing said blades, said annular member being movable to different positions to determine different lengths of exposure.

23. In a photographic apparatus, the combination with a single unitary housing, of shutter blade mechanism, a master member within said housing for operating said blade mechanism, means also within said housing for delaying the initial opening actuation of said blades by said master member and for retarding the closing of said blades after they have been opened, and an annular disk-like member turnably mounted on said housing and forming a part of the front wall thereof, said disk-like member controlling the extent of the delay in closing said blades and being movable to different positions to determine different lengths of exposure.

24. In a photographic apparatus, the combination with a single unitary housing, of shutter blade mechanism, a master member within said housing for operating said blade mechanism, means within said housing for delaying the initial opening actuation of said blades by said master member, and separate means also within the same housing for retarding the action of said master member in closing said blades after they have been opened.

25. In a photographic shutter, the combination with a blade mechanism, of means for actuating said blade mechanism, and a cam for controlling said actuating means, said cam comprising a comparatively thin strip of material, a backing member, and a comparatively thin connecting member extending between said backing member and said strip, said strip and connecting member being intentionally deformable to produce slight variations in the shape of the effective edge of said cam, but being sufficiently strong to withstand ordinary use.

In testimony whereof we hereunto affix our signatures.

FRIEDRICH DECKEL.
MARTIN GEIGER.